United States Patent
Tiedemann et al.

(10) Patent No.: US 6,735,728 B1
(45) Date of Patent: May 11, 2004

(54) UNIDIRECTIONAL VERIFICATION OF BUS-BASED SYSTEMS

(75) Inventors: Herbert Tiedemann, Boblingen (DE); Tilmann Wendel, Gartringen (DE); Jochen Rivoir, Magstadt (DE)

(73) Assignee: Agilent Technologies, Inc., Palo Alto, CA (US)

( * ) Notice: Subject to any disclaimer, the term of this patent is extended or adjusted under 35 U.S.C. 154(b) by 375 days.

(21) Appl. No.: 09/626,290

(22) Filed: Jul. 25, 2000

(30) Foreign Application Priority Data

Jul. 26, 1999 (EP) .............................. 99114613

(51) Int. Cl.$^7$ .............................................. G01R 31/28
(52) U.S. Cl. ................ 714/715; 714/712; 714/738; 714/819; 714/821
(58) Field of Search ................ 714/715, 712, 714/42, 821, 819, 720, 724, 738; 370/13; 235/153 AC (56) References Cited

U.S. PATENT DOCUMENTS

| | | |
|---|---|---|
| 3,810,577 A | 5/1974 | Drescher et al. |
| 4,622,669 A | 11/1986 | Pri-Tal |
| 5,197,062 A * | 3/1993 | Picklesimer ........... 370/13 |
| 5,596,715 A | 1/1997 | Klein et al. |
| 5,822,513 A * | 10/1998 | Ofer et al. ............ 714/42 |

FOREIGN PATENT DOCUMENTS

DE 43 33 953 A1 6/1994

OTHER PUBLICATIONS

Patent Abstracts of Japan. vol. 013, No. 527 (P–965). Nov. 24, 1989 & JP 01 214949 A (Fujitsu Ltd) Aug. 29, 1989 (abstract only).

* cited by examiner

*Primary Examiner*—Albert Decady
*Assistant Examiner*—Dipakkumar Gandhi (57) ABSTRACT

A testing unit for testing a data transfer and/or an addressing scheme in a bus-based system comprises a data generator for generating an expected data pattern and a comparator for comparing the expected data pattern with a data pattern received from a sending unit within the system. The data generator generates the expected data pattern in a defined relationship with the data generation of the data pattern received from the sending unit. Preferably, the defined relationship is an algorithmic relationship and can be based on the testing unit address.

16 Claims, 5 Drawing Sheets

UNIDIRECTIONAL VERIFICATION OF BUS-BASED SYSTEMS

BACKGROUND OF THE INVENTION

The present invention relates to a testing system for testing a bus-based system.

Modern data processing systems are often built up of a plurality of individual components interconnected by means of one or more internal or external busses. The individual components can be, for example, central processing units (CPUs), memories, RAID subsystems, cache system, NIC cards, mass storage devices, etc. Different internal or external busses (in the following only referred to as busses) are generally (inter-)connected using one or more bus interfaces. Each bus interface (also called bridge) is coupled between (at least) two busses or between one bus and e.g. a CPU subsystem, and only such information which is intended to pass to the 'other side' of the bus interface will be routed thereto. For that purpose, each bus interface "knows" the address(es) of component(s) connected to the respective bus and/or the types of transfers it has to route through (in case of a PCI bus, this information is configuration cycles, special cycles or interrupt acknowledge cycles).

Figure 1:
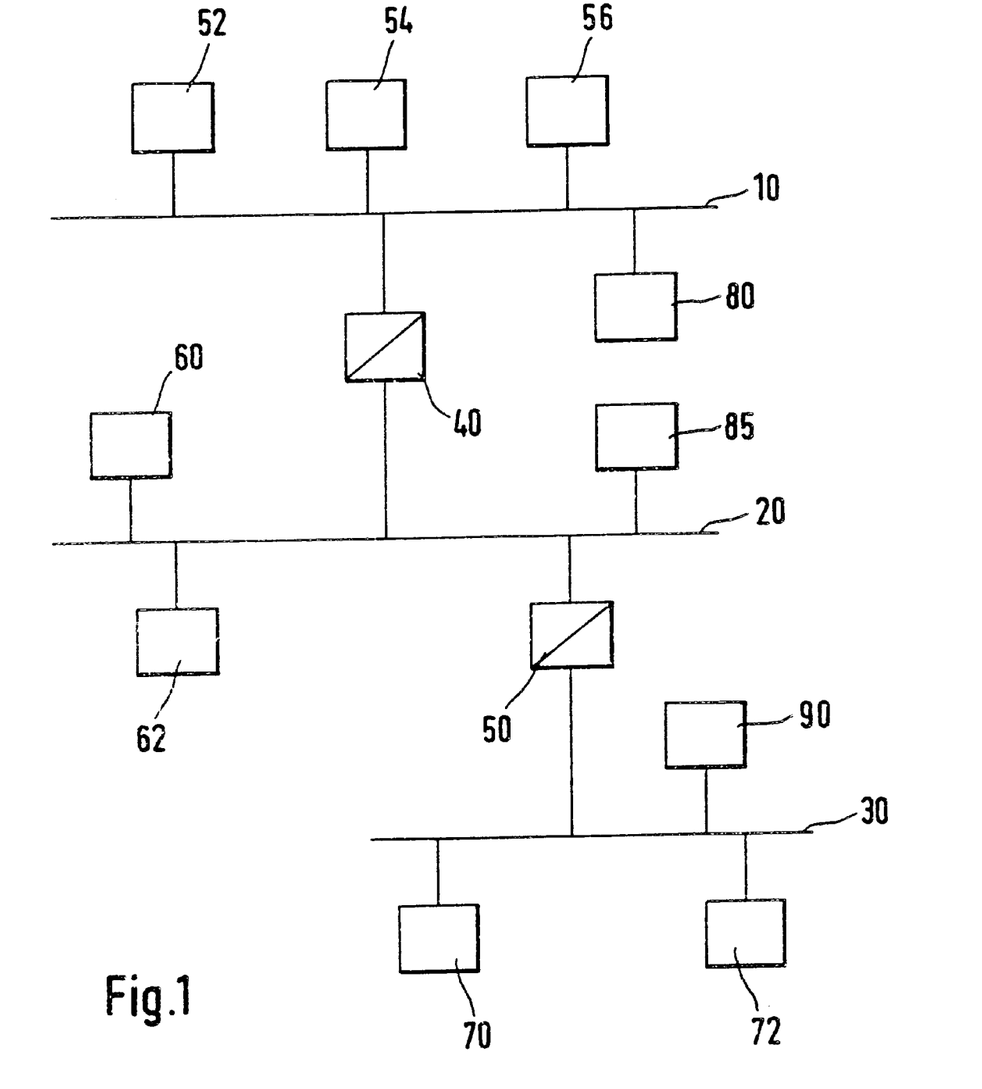
FIG. 1 depicts an example of a typical structure of a bus-based system.

FIG. 1 depicts an example of a typical structure of a bus-based system. The system comprises three busses 10, 20 and 30. A bus interface 40 is coupled between bus 10 and bus 20, and a bus interface 50 is coupled between bus 20 and bus 30. As examples for individual components within the bus-based system are components 52, 54 and 56, each coupled to bus 10, components 60 and 62, each coupled to bus 20, and components 70 and 72, each coupled to bus 30.

In operation, when, for example, component 52 wants or is requested to write an information to component 72, this information is first placed on bus 10. Bus interface 40, which "knows" that component 72 is coupled "somehow" to bus 20, routes that information to bus 20. Accordingly, bus interface 50, which "knows" that the component 72 is coupled to bus 30, routes that information to the bus 30. The component 72, connected to bus 30, can eventually receive and accept that information. In another example, when, for example, component 60 wants or is requested to read from component 70, component 60 initiates a read signal onto the bus 20. The bus interface 40 knowing that the component 70 is not coupled to bus 10 will not route that read signal onto bus 10. However, the bus interface 50 knowing that the component 70 is coupled to bus 30 will route the read signal to bus 30, and component 70 will thus receive the read signal from the bus 30.

In order to test (also referred to as verifying or validating) the structure of the bus-based system and also the functionality and accuracy thereof, in particular of the bus interfaces, tests are normally executed in the "naked" system generally without or only with a reduced number of components which could possibly be applied within the system. For this purpose the system will usually completely be 'populated' with test devices, e.g. inserted into each free slot for inserting components, so that every slot and every bus can participate in testing the system.

A test system known in the art is employed by the Hewlett-Packard HP E2920 PCI series and the HP E2976A System validation package and uses test cards coupled to individual busses for validating the bus-based system. In the. example of FIG. 1, a testing card 80 might be coupled to the bus 10, a testing card 85 might be coupled to the bus 20, and a testing card 90 might be coupled to the bus 30. For validating the structure of the bus-based system, each testing card can write information to any other testing card and eventually read that information again from that other testing card. If the information read out from the other testing card equals the information written thereto, it can be assumed that the transmission of the information has been executed without faults and thus that the structure insofar is without faults.

Figure 2:
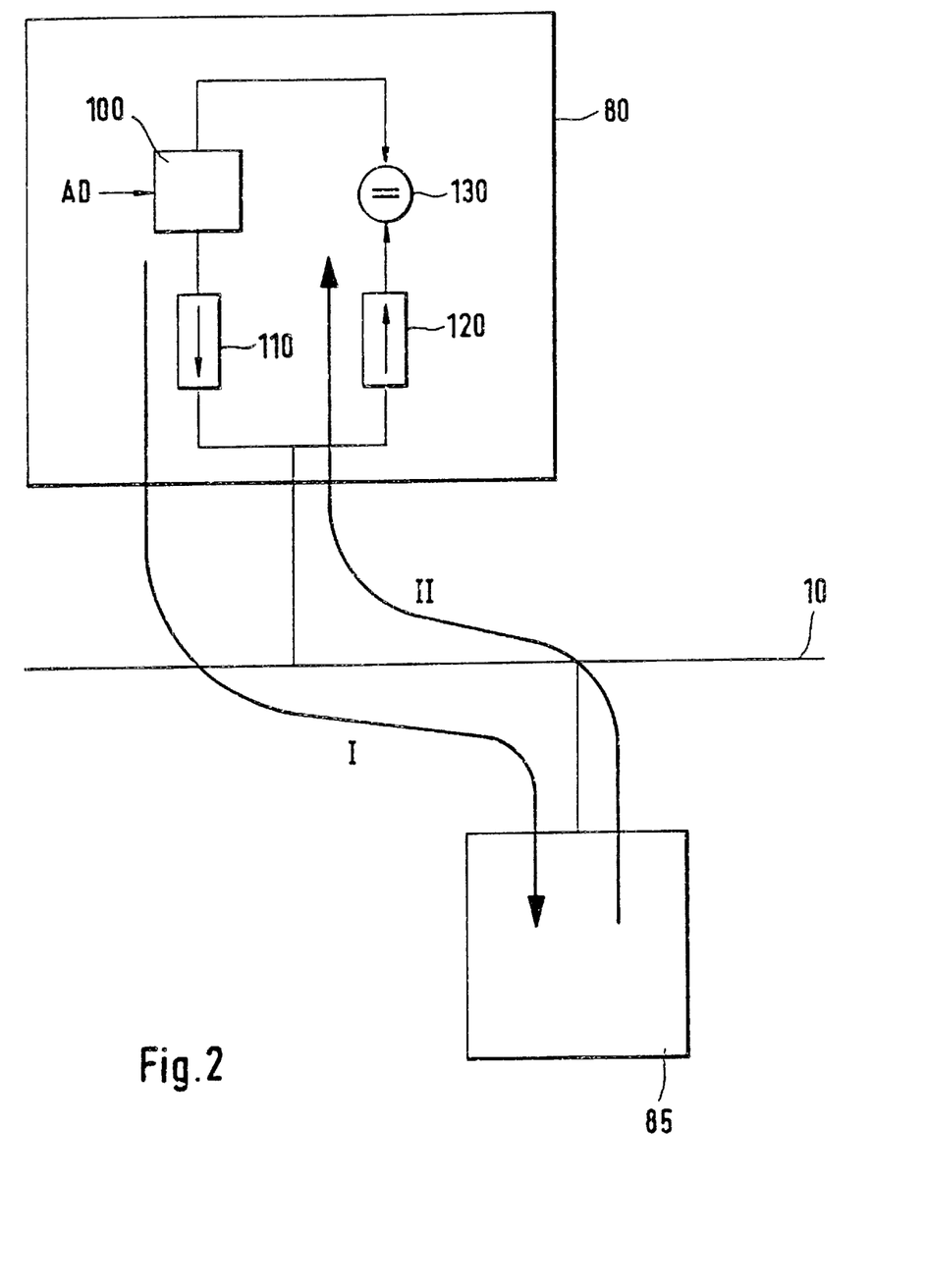
FIG. 2 depicts the principle structure of a testing card 80 as known in the art.

FIG. 2 depicts the principle structure of the testing card 80, as an example for all of the testing cards 80, 85 or 90. The 80 comprises a memory 100, a sender (which might also be referred to as data source or initiator) 110, a receiver (which might also be referred to as data target or completer) 120, and a comparator 130. For writing information onto the bus 10, the sender 110 reads out that information from the memory 100 and puts it on the bus 10. It is clear that the external address and the internal address do not need to have any relationship with each other.

For comparing the result of a writing action onto another testing card (direction of arrow I in FIG. 2) e.g. on the testing card 85 (as indicated in FIG. 2 as a connection of the testing card 85 to the bus 10), the sender 110 initiates a reading action (direction of arrow II in FIG. 2) onto the other testing card 85. The read-out information from the testing card 85 will eventually be available on bus 10 and the receiver 120 will place that information to the comparator 130 which compares that information with the information corresponding to that address AD as stored in the memory 100.

Although the testing cards as depicted in FIG. 2 already lead to a sophisticated validation and verification of bus-based systems, some structural faults are only hardly detectable. Such a fault could be, for example, when data bits are exchanged during the data transfer, so that e.g. the data is changed first in the first direction and then back again in the second direction of the transfer. In that case, the receiver receives an information different from the initial information from the sender. However, the changed information will be changed again (and thus might be corrected) when it is read out, so that the information eventually received by sender again might 'accidentally' equal the initial information. In such a case, the fault will not be detected. Another error that cannot be found is an addressing fault. If e.g. the address on bus 20 is slightly off the address on bus 10 because of address miscalculations within the bridge 40, the test device might still be able to receive the data and give it back again. In a real life system, wherein it is crucial that the data arrives correct and at the right place, this would cause an error.

SUMMARY OF THE INVENTION

It is an object of the present invention to further improve the validation of bus-based systems. The object is solved by the independent claims. Preferred embodiments are shown by the dependent claims.

In contrast to the conventional bi-directional data transmission scheme over the bus system for verifying purposes (as depicted by arrows I and II in FIG. 2), the invention is based on a concept of a unidirectional test data transmission over the bus-based system to be validated.

An inventive testing system provides a sending unit and a receiving unit, both coupled to or by at least one bus within the bus-based system. For testing (verification or validation) purposes, a data generator of the sending unit sends a specified information to the receiving unit. The receiving unit (directly) compares the received information sent from the sending unit with an information generated by a data generator of the receiving unit, whereby the data generation of the receiving unit is in a defined relationship with the data generation of the sending unit. Thus, the (test) information only has to travel once through the bus-based system and can be assessed and validated directly at and by the receiving unit.

The defined relationship between the data (pattern) generation of the sending unit and the receiving unit can be provided in different (deterministic) ways. One way could be an algorithmic relationship in a way that the receiving unit generates a data pattern making use of common information or knowledge that is available to both units. Thus, both units can test the other unit's data pattern for correctness.

Preferably, the algorithmic relationship is based on the address of the receiving unit because this is an information known to both units. It is noted that in almost all bus-based systems, a clear relationship between address and data is guaranteed. Using the address (as a 'seed')for generating data patterns also avoids problems, if the transfer gets interrupted or partitioned by systems, such as a bus interface, between the two units. Bus systems usually only guarantee that a certain data pattern arrives at a certain address. However, it normally does not guarantee that the sequence of transfers to be done is identical to the sequence originally provided by the initiator. An example for the address-based pattern generation is e.g. that the data pattern already is the address itself of the receiving unit, or somehow derived therefrom (e.g. negated or circulated).

The algorithmic relationship allows the computation of a data pattern without using expensive memory and allows bypassing the size limitations that are automatically given by the use of internal memory. Another advantage is the ability to calculate the appropriate data pattern even if the transfer got interrupted or the sequence of transfers is mixed up by the connecting system. This can be made clear be the following example: A card 1 (sender) sends out data a package A to an address A1 and a package B to an address B1, both addresses are within the same bus-based system or device. The connecting bus interface (or bridge) slices the transfer A into subtransfers Aa and Ab towards the addresses A1 and A1$b$ (which is A1 plus the length of Aa). In between these two transfers, the transfer B is put. Looking to two busses, the sequence of transfers on bus 1 is A and B, on bus 2 would, in our example, be Aa, B and Ab. The result is the same, but the sequence changed. The receiving card 2 (receiver) must now have a way of determining the expected data pattern out of the address this pattern is written to. This would not be possible if a fixed or otherwise generated sequence of data pattern is expected without taking the address information into account. The hardware effort of such a solution is very low, no extra connection (which would result in a complex network, if several test cards in various busses are used).

Another solution could be a (direct) connection between the respective data generators outside the bus-based system. Such a connection could be a (hardware) connection e.g. over respective connection lines or a wireless communication between the data generators.

A further solution could be provided by sending a pre-information from the sending unit to the receiving unit, instructing the receiving unit to generate a defined data pattern to be compared later on with a data pattern sent successively from the sending unit.

A further way to establish a defined relationship between the respective data generation could be by employing only predefined information so that the receiving unit knows in advance which data pattern will be sent from the sending unit. This can be accomplished e.g. by always using the same data pattern or by using different data patterns, but with a defined relationship between them (e.g. data pattern 1 at time 1, data pattern 2 at time 2 and so on). Preferably, time relationships could be determined using the time elapsed e.g. from a boot or power up action, or from the amount of data transferred.

Yet a further solution could be providing a defined timing relationship between the data generation of the respective units. This can be accomplished e.g. by a fixed relationship used for the timing of the generation of the data patterns, so that it is clear for the receiving unit at a certain point in time which data pattern is expected from the sending unit.

The receiving unit compares the received data pattern sent from the sending unit with the data pattern generated by the receiving unit. Thus, the receiving unit can draw back conclusions whether the routing of the information within the bus-based system works accurately, or, in other words, whether information gets to the correct address. Furthermore, data failures within the bus-based structure can be evaluated, or, in other words, it can be validated whether information is changed within a bus-based system.

By providing unidirectional flow of the test data, the invention significantly reduces the testing time, which is in particular paramount in bus-based systems with a plurality of different addresses and tests to be performed. The invention further allows reducing the effort required for the entire testing system. The time required for testing is not only shorter (because of the data transfer only in one direction), but also two tests can be executed concurrently i.e. data accuracy and correct addressing.

In an example, a system with altogether twenty possible slots for inserting cards is to be tested. Each test card for verifying the system should be able to test each other of remaining nineteen test cards. In a conventional application, each card would have to be equipped with internal memory of at least 1 Mbyte reserving 64 Kbytes exclusively for each test card. For high-speed memories, this would sum up with currently about $50 per test card. totaling to $1000 for the entire test system. This memory space will not be required in the test systems according to the invention (and the $1000 could be saved in that example), since the test pattern do not have to be stored but can be independently generated based on common knowledge between sender and receiver.

Another significant improvement provided by the invention is that an almost unlimited address range can be tested because a data generator can easily represent e.g. a 32 or even 64 bit address space with unique data patterns behind each address which would be either extremely expensive or impossible to do with conventional memory. Thus, address ranges can be tested which could not have been tested in an economically reasonable manner with the testing methods as known in the art.

It is clear that the terms sending or receiving unit do not necessarily have to relate to individual, physically separated units, but also applies to units wherein the sending and/or receiving functionality in accordance with the present invention is embodied as a sub-function or sub-module. The invention allows that a data generation and/or data comparison unit in accordance with the invention can be implemented into parts or components of the system, e.g. into a bus interface, bridge, special chip, or a chip set which might be coupled with a system memory. Thus, any interface between this part or component and another test receiver can be tested even if it is normally not accessible by an outside card. This way, testing is not limited to externally accessible slots e.g. for test cards, but these units with (built-in) testing capability in accordance with the invention can actively access other devices as if they were e.g. specific test cards (because their behavior, generating or accepting data patterns of a certain kind is known).

The term 'bus' as used herein is to be understood in the broadest possible sense of word and might mean any kind of connection (wired or wireless; electrically, optically, magnetically, acoustically—in any wavelength range) whether in its simplest form or as a more or less combination of a plurality of individually units, devices or components. Typical examples of busses could be AGP Bus, PCI Bus, PCI-X Bus, EISA Bus, ISA Bus, Firewire etc. In this sense, even a serial connection between two or more units could represent a 'bus'.

BRIEF DESCRIPTION OF THE DRAWINGS

Other objects and many of the attendant advantages of the present invention will be readily appreciated and become better understood by reference to the following detailed description when considering in connection with the accompanied drawings. Features that are substantially or functionally equal or similar will be referred to with the same reference sign(s).

DETAILED DESCRIPTION OF THE INVENTION

Figure 3:
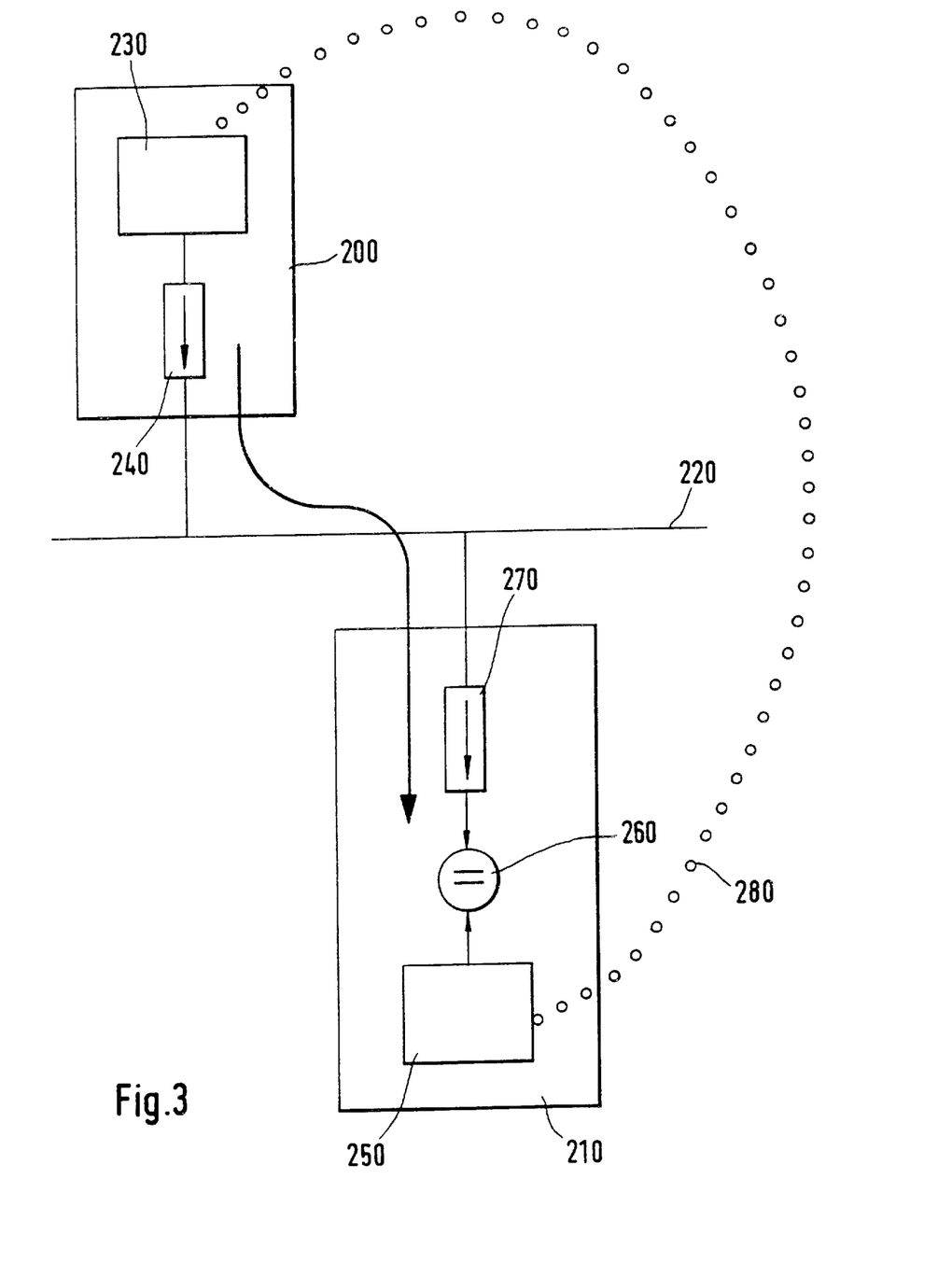
FIG. 3 shows the principal structure of the validation scheme of a bus-based system in accordance with the present invention.

FIG. 3 shows the principal structure of the validation scheme of a bus-based system in accordance with the present invention. A sending unit 200 and a receiving unit 210 are both coupled to a bus 220. The bus 220 can be a single bus or a bus system with a plurality of individual busses as depicted e.g. in FIG. 1 The sending unit 200 comprises a data generator 230 and a sender (master or initiator) 240. The receiving unit 210 comprises a data generator 250, a comparator 260 and a receiver (target or completor) 270.

In operation, the initiator of a transfer (which can be the sending unit 200 or the receiving 210) initiates a transaction, and the other agent (then: the receiving 210 or the sending unit 200) participates at this transfer. The direction of the transfer depends on the initiator, which can issue a read or write command. The sender 240 sends out the data, while the receiver 270 satisfies that transaction by receiving the data. E.g. in a PCI environment, the initiator that wants to read data from a target always has to request for this data until the receiver eventually provides the requested data (in a read case). In a PCI-X environment, the receiver will independently and automatically return to the sender to complete the request.

In more detail, the sender 240 of the sending unit 200 places a data pattern generated by the data generator 230 and addressed to the receiving unit 210 onto the bus 220. The receiver 270 of the receiving unit 210 receives the data pattern (sent from the sending unit over the bus 220) and passes that received information to the comparator 260. The comparator 260 further receives a data pattern generated by the data generator 250 of the receiving unit 210 and compares these two data patterns. The generation of the data pattern by the data generator 250 is executed in a defined and deterministic relationship with the generation of the data pattern by the data generator 230 of the sending unit 200. The defined relationship between the data generation of the data generator 230 and the data generator 250 is hinted in FIG. 3 by a dotted line 280.

When the two data patterns in the comparator 260 match, the data transmission from the sending unit 200 to the receiving unit 210 has occurred without failures. Otherwise, it is clear that a failure in the data transmission between the sending unit 200 and the receiving unit 210 has occurred and the source of that failure might be traced back.

In a preferred embodiment and after a test has been executed, the receiver 210 is queried (e.g. from a test software) to submit information (e.g. to the test software) whether the receiver 210 has received the information sent from the sender 200, what the received information was or contained (e.g. how many bytes), and whether a fault has been determined by the receiver 210. If any faults or inconsistencies are detected in that way, a report will be generated and an alarm can be given. This depends on the actual test implementation.

In another preferred embodiment, the defined relationship between the data generators 230 and 250 is provided by a data generation based on the address of the receiving unit 210. The address of the receiving unit 210 is used for generating an injective (or bijective) data pattern as well by the data generator 230 of the sending unit 200 as by the data generator 250 of the receiving unit 210. Detailed examples will be given later.

Figure 4:
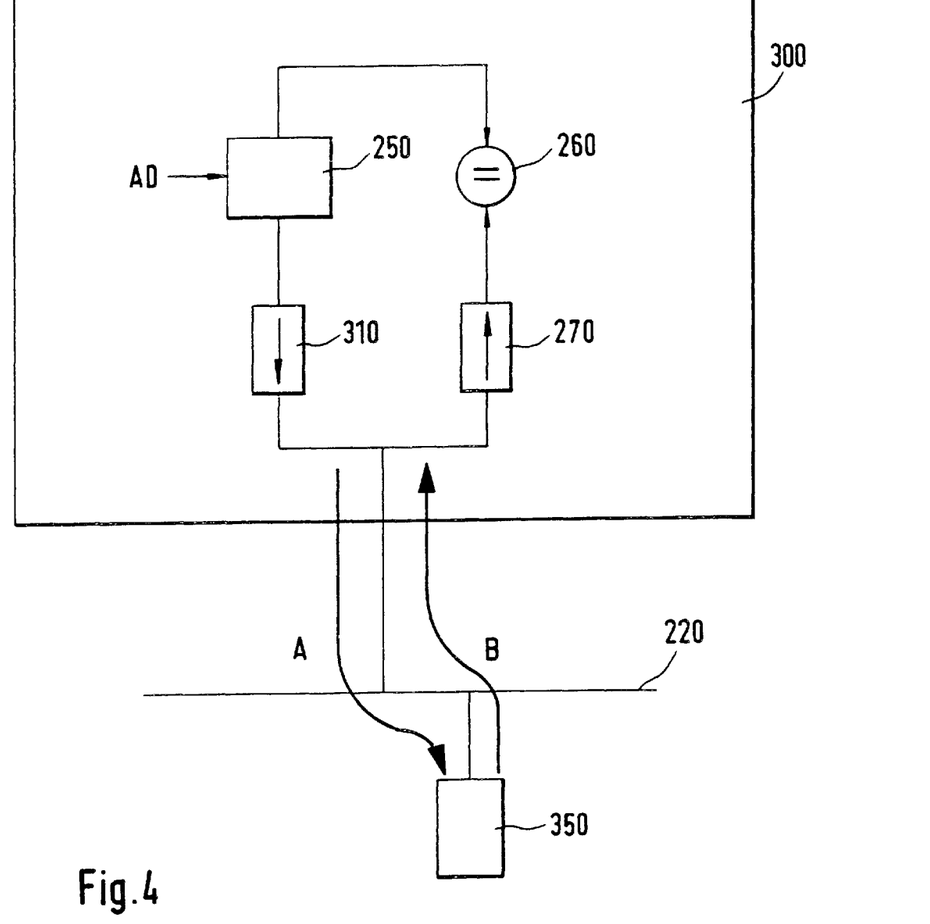
FIG. 4 shows an embodiment of a testing unit 300 in accordance with the present invention.

FIG. 4 shows an embodiment of a testing unit 300 in accordance with the present invention. In contrast to the receiving unit 210 as depicted in FIG. 3, the testing unit 300 of FIG. 4 comprises receiving as well as sending functionality. Thus, the testing unit 300 can provide the functionality of the sending unit 200 as well as of the receiving unit 210. The testing unit 300 comprises the receiver 270 and the data generator 250 both coupled to the comparator 260. The testing unit 300 further comprises a sender 310 coupled to the data generator 250 in order to transmit information, e.g. generated by the data generator 250, to the bus 220. Thus, each testing unit 300 provides an independent testing device, so that a validation of the bus-based system can be executed in both directions.

In example of FIG. 4, testing of a bus-based system can be provided from the testing unit 300 to (direction of arrow A) a testing unit 350 (which might be built up substantially in accordance with the testing unit 300), and vice versa (direction of arrow B).

In general terms, data patterns on the bus 220 are generated by a data source (i.e. in accordance with the sending unit 200 or the testing unit 300) using a data generator. The data patterns are verified at the site of (at least) another participant (e.g. in accordance with the testing unit 300 or the receiving unit 210) of the transfer against an identical (as far as the receiver can determine the original sent data pattern) or correspondingly related (as far as the receiver can determine only a data pattern corresponding to the original sent data pattern) data source.

It is clear that it is not required that the receiver generates exactly the same data pattern as the data pattern sent by the sender. It is only required that the receiver can compare somehow the received with the own generated data pattern in order to verify whether the original data pattern sent from the sender has been changed during the transmission from the sender to the receiver.

In one embodiment, the data generators of the sender and the receiver are built up identically. In another embodiment, the receiver combines (e.g. XOR) a negated version of the expected sender data pattern with the actually received sender data pattern.

There are various ways of generating deterministic data patterns. Preferably, a defined entry point into the sequence of data patterns is applied. This is in particular useful since because the transfer between the two agents can be interrupted any time by the underlying system (e.g. by the bridges or subsystem in between the two busses where the two agents are physically located) and the test card needs an automatic system of recovering from these interruptions. Preferably, the (sending) address of the recipient of the information is used as that entry point to generate a data pattern that is repeatable and can easily be verified by the other participant.

Examples of different solutions for generating data patterns based on the address are given following:
1. The address itself is used as a pattern, or, in other words, the address represents the data, or vice versa. In that case, the receiving participant will simply compare the received data pattern with its own address.
2. A data pattern is generated with an algorithmic relationship to the address.
3. Bits of the address are exchanged or scrambled (in a reproducible manner). In an example: Bit 1 will be change to place 17, bit 2 to place 30, bit 3 to place 1, bit 4 to place 9, bit 5 to place . . . and so on until bit 64 (or bit 32 in a pure 32 bit system).
4. The address is negated.
5. An internal memory is used and filled with an arbitrary data pattern. Any pattern might be used, however, limitations in the size might be encountered.
6. Counters can be used which are controlled or preset according to portions (e.g. up to all bits) of the address. Possible implementations may include walking ones/zeros, toggle values (e.g. 0000/FFFF or 5555/AAAA—in hexadecimal code- or similar), Gray code (cf. e.g. http://www.schuelerakademie.de/kurse/krypto/graycode.html as an example for a Gray code or similar code implementations.

Figure 5:
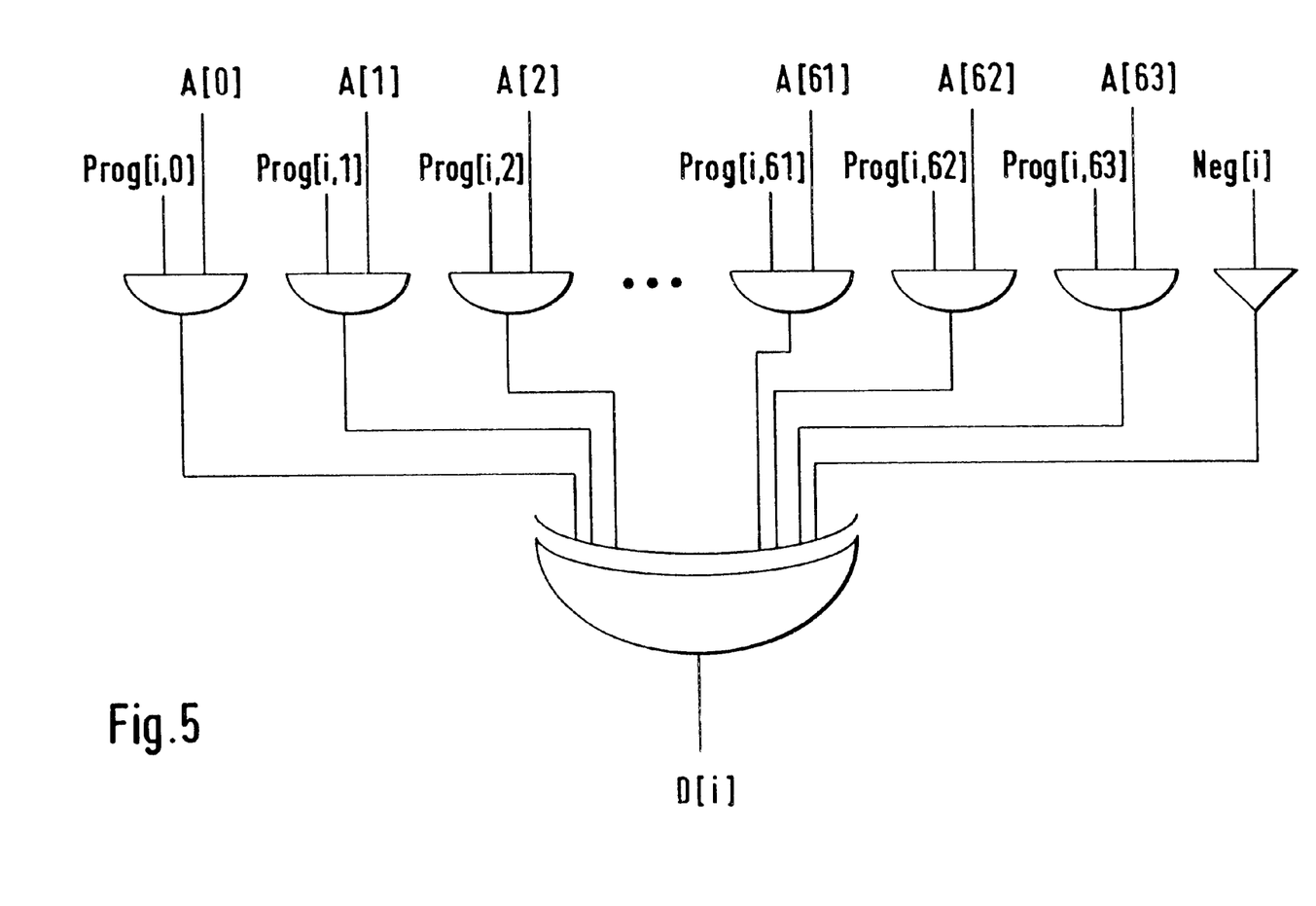
FIG. 5 depicts an embodiment of a generic data generator 250.

FIG. 5 depicts an embodiment of a generic data generator 250 for generating data pattern using an address pattern (vector A[0] to A[63]) and a preprogrammed set of registers (vector Prog[i,0] to Prog[i,63] for one data bit D[i]). In case of a 64 bit bus (e.g. PCI, PCI-X) this would require 65 registers of 64 bit width. FIG. 5 shows a logical circuit for generating the data bit D[i]. Every individual data bit D[i] will be provided by an independent circuit in accordance with FIG. 5, and every data bit D[i] depends on all address pins (vector A[0] to A[63] as a complete 64 bit address) and on a programming register (vector Prog[i], also as a 64 bit data word with Prog[i,0] to Prog[i,63]). Those 64 programming registers together with the negating register Neg[i] have to be substantially identical on every test card in the system.

The dependency of the data pattern of the address bits (vector A[0] to A[63]) in FIG. 5 is programmable and thus extremely flexible. In an example, generating the negated address as a data pattern is done in a way that Neg[i] is set to 1, that Prog[i,i] is also set to 1, and all other Prog [j,k] with j not equal to k are set to 0.

It is to be understood that each testing unit 300 or receiving unit 210 can manage a plurality of different addresses, so that only one testing unit 300 or receiving unit 210 might be required for virtually testing a full range of addresses. Thus, an almost unlimited range of addresses can be tested without requiring additional hardware such as costly memories.

In a preferred embodiment of the invention, a data generation unit (such as the data generator 230 and/or 250) and/or a data comparison unit (such as the comparator 260) in accordance with the invention are implemented into parts or components of a bus-based system. In the example of FIG. 1, e.g. the bus interface 40 or any other of the components 52–56, 60–62, or 70–72 at least comprises an additional functional unit with the data generator 230 to provide the data sending functionality of the sending unit 200 or the testing unit 300, or the data generator 250 together with the comparator 260 to provide the data receiving functionality of the sending unit 210 or the testing unit 300. Further switching units for switching from the original functionality of the device to the additional testing functionality might be provided as far as required by the respective application.

The following more specific example uses as data pattern the negated address. There shall be two agents in a system, a test card TC1 (e.g. the testing unit 300) and a test card TC2 (e.g. the testing unit 350). The test card TC1 wants to write 2×32 bit on the test card TC2. The test card TC2 has as start address 0x00008000 (hexadecimal), the transferred data (negated) is 0xffff7fff and 0xffff7ffb. The reason for the offset 'b' for the second data pattern is that the address jumps by the value of 4, due to the fact that it is counted in bytes and 4 bytes are automatically transferred with one transfer. A bridge (or subsystem) in between these two agents accepts the transfer in one burst.

To send the data to the test card TC2, the bridge uses two smaller data packages, one with the address 0x00008000 and the date 0xffff7fff and another one with address 0x00008004 and the date 0xffff7ffb. The test card TC2 accepts both packages (even the sequence of these two packages does not matter) and can now use the rule on how to create the data out of the address (in that case: negate) to verify the correctness of the received data pattern. The registers, as described in FIG. 5 have, in that case, the following values: Neg is filled with 0xffffffff, Prog[i,j] is 0 for all j < > i. In other words, Prog[0]=0x00000001, Prog[1] 0x00000002, Prog[3] =0x00000004, Prog[4]=0x00000008 and so on until Prog[31] =0x80000000(Prog[32] through Prog[63]=0x00000000). These values must either be programmed in advance of the test or it can be preset in the test card that they are automatically used or programmed from power up. This is implementation specific.

What is claimed is:
1. A bus based system comprising a first unit, a second unit, and a link between the first and second units, the first and second units being respectively coupled to the link at first and second different locations, the second unit having an address, the first unit being arranged for generating a data pattern associated with the address of the second unit and for coupling the data pattern to the link, bits of said data pattern having a defined relationship with the address of the second unit, the second unit being arranged to be responsive to data patterns transmitted via the link for (a) comparing said data pattern with a data pattern generated by the second unit and for deriving a test result, and (b) signaling that the data pattern was successfully transmitted from the first unit to the second unit via the link in response to the defined relation- ship existing between the address of the second unit and bits of a data pattern coupled to the second unit via the link being the data pattern associated with the address of the second unit.

2. The system of claim 1 wherein the address is represented by several bits and the data pattern includes several bits and the second unit comprises: (a) a receiver adapted to be coupled to the link and to be responsive to data patterns being transmitted via the link, (b) a data generator for generating several bits indicative of the address of the unit, and (c) a comparator coupled to be responsive to the receiver and data generator for deriving the test result as a signal indicating that the data pattern was successfully transmitted from the first unit to the second unit via the link in response to the defined relationship existing between the address bits of the data generator and bits of a bit pattern received by the receiver via the link.

3. The system of claim 1 further including a link independent of the bus based system between the first and second units for coupling the defined relationship between the first and second units.

4. The system of claim 1 wherein the address is represented by several bits and the data pattern includes several bits and the first unit is arranged for sending to the second unit a signal indicative of the bits associated with the bits of the second unit prior to the first unit coupling the data pattern to the link, and the second unit is arranged for receiving the signal and for causing the data pattern to be signaled as being successfully transmitted in response to the signal transmitted by the first unit prior to the first unit coupling the data pattern to the link.

5. The system of claim 1 wherein the defined relationship is an algorithmic relationship.

6. A method of testing a link of a bus based system having a first unit at a first location of the link and a second unit at a second location of the link, the second unit having an address associated with it, the method comprising the steps of at the first location coupling a data pattern from the first unit to the link, the data pattern being associated with the address of the second unit so that bits of said data pattern have a defined relationship with the address of the second unit, at the second unit signaling that the data pattern was successfully transmitted from the first location to the second location by determining that a defined relationship exists between (a) the address of the second unit and (b) the data pattern associated with the address of the second unit being coupled to the second unit via the link, the defined relationship being determined without a transmission back from the second unit to the first unit.

7. The method of claim 6 further comprising the step of coupling the defined relationship from the first unit to the second unit prior to the first unit coupling the data pattern to the link.

8. The method of claim 7 wherein the defined relationship is coupled via a link independent of the bus based system.

9. The method of claim 6 further including sending from the first unit to the second unit a signal indicative of the data pattern associated with the address of the second unit prior to the first unit coupling the data pattern to the link, at the second unit receiving the signal and signaling that the data pattern has been successfully transmitted in response to the signal transmitted by the first unit prior to the first unit coupling the data pattern to the link.

10. A unit for use in testing a bus based system having a link adapted to include a device, the unit and device being adapted to be coupled to different locations of the link, the unit having an address, the device being adapted to couple a data pattern to the link, the data pattern being associated with the address of the unit, bits of said data pattern having a defined relationship with the address of the second unit, the unit comprising: (a) a receiver adapted to be coupled to the link and to be responsive to data patterns being transmitted via the link, (b) a data generator for generating a data signal havinig a predeternined relationship to the address of the unit, and (c) a comparator coupled to be responsive to the receiver and the data generator for deriving a test result signaling that the data pattern was successfully transmitted from the first unit to the second unit via the link in response to the defined relationship existing between the address of the second unit and bits of a data pattern coupled to the second unit via the link being the data pattern associated with the address of the second unit.

11. The unit of claim 10 wherein the generator is arranged for signaling that the data pattern was successfully transmitted from the device to the unit via the link in response to a defined relationship existing between the address data signal of the data generator and a data pattern received by the receiver via the link being the data pattern associated with the address of the unit.

12. The unit of claim 10 wherein the data generator includes a multibit address pattern source, a preprogrammed set of registers for deriving a multibit word, and a logic circuit connected to be responsive to the multibit address pattern source and the multibit word.

13. The unit of claim 10 further including a sender coupled to be responsive to the data generator and adapted to be coupled to the link for supplying a further data pattern to the link.

14. A bus based system comprising a first unit, a second unit, and a link between the first and second units, the first and second units being respectively coupled to the link at first and second different locations, the second unit having an address, the first unit being arranged for generating a data pattern associated with the address of the second unit and for coupling the data pattern to the link, bits of said data pattern havinig a defined relationship with the address of the second unit, the second unit being arranged to be responsive to data patterns transmitted via the link and for comparing a data pattern transmitted to the second unit via the link with a data pattern generated by the second unit and associated with the address of the second unit, the second unit being arranged for deriving a test result signaling, that the data pattern was successfully transmitted from the first unit to the second unit via the link in response to the comparison indicating a defined relationship existing between a data pattern associated with the address of the second unit and a data pattern coupled to the second unit via the link being the data pattern associated with the address of the second unit.

15. A method of testing a link of a bus based system having a first unit at a first location of the link and a second unit at a second location of the link, the second unit having an address associated with it, the method comprising the steps of at the first location coupling a data pattern from the first unit to the link, the data pattern being associated with the address of the second unit so that bits of said data pattern have a defined relationship with the address of the second unit, at the second unit deriving a test result by comparing the data pattern coupled to the second unit via the link with a data pattern generated by the second unit.

16. The method according to claim 15, further including responding to the comparing step by signaling that the data pattern was successfully transmitted from the first location to the second location as a result of a defined relationship existing between the data pattern coupled to the second unit via the link with the data pattern generated by the second unit, the defined relationship being determined without a transmission back from the second unit to the first unit.

* * * * *